United States Patent
Lu (10) Patent No.: US 11,204,528 B2
(45) Date of Patent: Dec. 21, 2021

(54) METAMATERIAL STRUCTURE UNIT, METAMATERIAL AND ELECTRONIC DEVICE

(71) Applicant: BOE TECHNOLOGY GROUP CO., LTD., Beijing (CN)

(72) Inventor: Yongchun Lu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 293 days.

(21) Appl. No.: 16/489,916

(22) PCT Filed: Feb. 28, 2019

(86) PCT No.: PCT/CN2019/076484
§ 371 (c)(1),
(2) Date: Aug. 29, 2019

(87) PCT Pub. No.: WO2019/237765
PCT Pub. Date: Dec. 19, 2019

(65) Prior Publication Data
US 2021/0333648 A1    Oct. 28, 2021

(30) Foreign Application Priority Data
Jun. 15, 2018 (CN) .......................... 201810622670.5

(51) Int. Cl.
*G02F 1/1343* (2006.01)
*H01Q 15/00* (2006.01)

(52) U.S. Cl.
CPC .... *G02F 1/134309* (2013.01); *G02F 1/13439* (2013.01); *H01Q 15/0086* (2013.01)

(58) Field of Classification Search
CPC .................... H01Q 15/0086; G02F 1/13439
See application file for complete search history.

(56) References Cited

U.S. PATENT DOCUMENTS

2006/0139540 A1* 6/2006 Lu ..................... G02F 1/133707
349/129

* cited by examiner

*Primary Examiner* — Thoi V Duong
(74) *Attorney, Agent, or Firm* — Dave Law Group LLC; Raj S. Dave (57) ABSTRACT

A metamaterial structure unit, a metamaterial and an electronic device. The metamaterial structure unit includes a first substrate, a second substrate, a liquid crystal layer between the two substrates, and a first electrode on the first substrate and a second electrode on the second substrate. The first electrode includes a first connecting portion, a first strip structure and a plurality of first circular arc structures on a first circumference. The second electrode includes a second connecting portion, a second strip structure and a plurality of second circular arc structures on a second circumference. In a case that the first electrode is rotated by 90 degrees around a center of the first circumference, a projection of the first electrode on the second substrate in a direction perpendicular to the second substrate coincides with the second electrode.

18 Claims, 6 Drawing Sheets

METAMATERIAL STRUCTURE UNIT, METAMATERIAL AND ELECTRONIC DEVICE

CROSS-REFERENCE TO RELATED APPLICATIONS

The present application is a U.S. national stage of International Patent Application No: PCT/CN2019/076484, filed Feb. 28, 2019, which claims priority of Chinese patent application No. 201810622670.5, filed on Jun. 15, 2018, the contents of which are incorporated in their entireties as portion of the present application by reference herein.

TECHNICAL FIELD

Embodiments of the present disclosure relate to a metamaterial structure unit, a metamaterial and an electronic device.

BACKGROUND

Metamaterials are a new class of materials that have emerged in recent years, referring to composite materials that have an artificially designed structure and exhibit extraordinary physical properties not found in natural materials. Metamaterials have special properties not found in natural materials. These special properties are mainly derived from the special structure of artificial design. With the continuous deepening of the global "Industry 4.0" process and the continuous expansion of the "intelligence+" application field, 100-billion-scale metamaterial industry clusters that can drive such fields as high-speed trains, new ground-based moving equipment, aerospace and ground-based intelligent robots are rising, and the design and development of functional materials are entering a new era.

SUMMARY

At least one embodiment of the present disclosure provides a metamaterial structure unit, which includes a first substrate and a second substrate opposite to each other, a liquid crystal layer between the first substrate and the second substrate, a first electrode on the first substrate and a second electrode on the second substrate, wherein the first electrode comprises a first connecting portion, a first strip structure and a plurality of first circular arc structures on a first circumference, the first strip structure is distributed along a radial direction of the first circumference and is separated from the first circular arc structures, the first connecting portion is electrically connected to the first strip structure and the plurality of first circular arc structures, the second electrode comprises a second connecting portion, a second strip structure and a plurality of second circular arc structures on a second circumference, the second strip structure is distributed along a radial direction of the second circumference and is separated from the second circular arc structures, the second connecting portion is electrically connected to the second strip structure and the plurality of second circular arc structures, in a case that the first electrode is rotated by 90 degrees around a center of the first circumference, a projection of the first electrode on the second substrate in a direction perpendicular to the second substrate coincides with the second electrode.

For example, in the metamaterial structure unit provided by an embodiment of the present disclosure, the plurality of first circular arc structures comprise two circular arc structures axisymmetrically distributed about the first strip structure, the plurality of second circular arc structures comprise two circular arc structures axisymmetrically distributed about the second strip structure.

For example, in the metamaterial structure unit provided by an embodiment of the present disclosure, both a perimeter of the first circumference and a perimeter of the second circumference are less than 1.5 times of an average wavelength of a target electromagnetic wave propagating in the first substrate, the second substrate, and the liquid crystal layer.

For example, in the metamaterial structure unit provided by an embodiment of the present disclosure, both a length of the first strip structure and a length of the second strip structure are less than 0.5 times of an average wavelength of a target electromagnetic wave propagating in the first substrate, the second substrate, and the liquid crystal layer.

For example, in the metamaterial structure unit provided by an embodiment of the present disclosure, both a length of each of the plurality of first circular arc structures and a length of each of the plurality of second circular arc structures are greater than ¼ of a perimeter of the first circumference or the second circumference.

For example, in the metamaterial structure unit provided by an embodiment of the present disclosure, the first connecting portion comprises a first electrical lead, the first electrical lead is electrically connected to the first strip structure and the plurality of first circular arc structures, the second connecting portion comprises a second electrical lead, the second electrical lead is electrically connected to the second strip structure and the plurality of second circular arc structures.

For example, in the metamaterial structure unit provided by an embodiment of the present disclosure, the first electrical lead is perpendicular to the first strip structure and passes through the center of the first circumference, the second electrical lead is perpendicular to the second strip structure and passes through a center of the second circumference.

For example, in the metamaterial structure unit provided by an embodiment of the present disclosure, both a width of the first electrical lead and a width of the second electrical lead are less than 10 μm.

For example, in the metamaterial structure unit provided by an embodiment of the present disclosure, the first connecting portion, the first strip structure and the plurality of first circular arc structures are in a same layer, the second connecting portion, the second strip structure and the plurality of second circular arc structures are located in a same layer.

For example, in the metamaterial structure unit provided by an embodiment of the present disclosure, sizes of the metamaterial structure unit in three directions in a Cartesian coordinate system are less than 0.5 times of a wavelength of a target electromagnetic wave propagating in a free space.

For example, in the metamaterial structure unit provided by an embodiment of the present disclosure, the first electrode and the second electrode are respectively located on surfaces of the first substrate and the second substrate facing each other.

For example, the metamaterial structure unit provided by an embodiment of the present disclosure further includes a first alignment layer and a second alignment layer, wherein the first alignment layer and the second alignment layer are respectively located on surfaces of the first substrate and the second substrate facing each other.

For example, in the metamaterial structure unit provided by an embodiment of the present disclosure, the liquid crystal layer includes nematic liquid crystal.

For example, the metamaterial structure unit provided by an embodiment of the present disclosure further includes a package structure, wherein the package structure is located between the first substrate and the second substrate and surrounds the liquid crystal layer.

At least one embodiment of the present disclosure further provides a metamaterial, which includes the metamaterial structure unit provided by any one embodiment of the present disclosure.

For example, at least one embodiment of the present disclosure further provides a metamaterial, which includes a plurality of metamaterial structure units, the plurality of metamaterial structure units share the first substrate and the second substrate.

At least one embodiment of the present disclosure further provides an electronic device, which includes the metamaterial structure unit provided by any one embodiment of the present disclosure or the metamaterial provided by any one embodiment of the present disclosure.

For example, the electronic device provided by an embodiment of the present disclosure includes a bias voltage, wherein the first electrode and the second electrode are configured to be connected to the bias voltage source to provide a bias electric field to the liquid crystal layer.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "a", "and", "the" and the like do not mean a limit of the quantity, but mean that there is at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Compared with ordinary dielectric materials, metamaterials have a series of special electromagnetic properties. For example, some metamaterials can have a dual negative characteristic (the dielectric constant and the magnetic permeability are negative at the same time), a left-handed characteristic (when an electromagnetic wave propagates therein, the electric field, the magnetic field and the propagation direction constitute a left-handed orthogonal system), a backward wave characteristic (the wave front propagating direction is opposite to the energy propagating direction, that is, the phase velocity is opposite to the group velocity), a negative refraction characteristic (the refractive index of the medium is negative, that is, when the electromagnetic wave refracts at an interface of the metamaterials and an ordinary medium, the refracted beam will be on the same side of the normal line of the interface as the incident beam), an inverse Doppler effect and an inverse Cherenkov radiation effect, etc.

Metamaterials are usually formed by a periodic distribution of metamaterial structure units in space, so the properties of metamaterial structure units determine the properties of metamaterials. In recent years, in order to further expand the application field of metamaterials, metamaterials with tunable capabilities have gradually developed, that is, by introducing electronic control components or electronic control media into the metamaterial structure units to achieve the tunable capabilities, so that the operating frequency of metamaterials can be changed in real time under the action of an external electric field or magnetic field. Among the tunable metamaterial technologies, the tunable metamaterials based on liquid crystal have attracted wide attention due to a small linear noise and a large operating frequency range.

However, the performance of the current liquid crystal tunable metamaterials is not perfect. For example, some liquid crystal tunable metamaterials have only a single characteristic of negative dielectric constant or negative magnetic permeability, and electromagnetic waves undergo a serious energy attenuation when propagating in such metamaterials; other liquid crystal tunable metamaterials have only an one-dimensional characteristic, that is, they can only exhibit application characteristics to incident electromagnetic waves in specified transmission direction and polarization direction, and cannot support electromagnetic waves incident in multiple directions. These imperfections in performance severely limit the application scenarios and development prospects of liquid crystal tunable metamaterials.

At least one embodiment of the present disclosure provides a metamaterial structure unit, a metamaterial and an electronic device. The metamaterial structure unit has dual negative characteristics (dielectric constant and magnetic permeability are negative, simultaneously) in two dimensions, of which the operating frequency band of the dual negative characteristics can be tuned, and has a simple structure and is easy to be processed with high precision.

Hereinafter, the embodiments of the present disclosure will be described in detail with reference to the accompanying drawings. It should be noted that the same reference numerals in different drawings will be used to refer to the same elements that have been described.

At least one embodiment of the present disclosure provides a metamaterial structure unit, which includes a first substrate and a second substrate opposite to each other, a liquid crystal layer between the first substrate and the second substrate, a first electrode on the first substrate and a second electrode on the second substrate. The first electrode includes a first connecting portion, a first strip structure and a plurality of first circular arc structures on a first circumference, the first strip structure is distributed along a radial direction of the first circumference and is separated from the first circular arc structures, the first connecting portion is electrically connected to the first strip structure and the plurality of first circular arc structures, the second electrode includes a second connecting portion, a second strip structure and a plurality of second circular arc structures on a second circumference, the second strip structure is distributed along a radial direction of the second circumference and is separated from the second circular arc structures, the second connecting portion is electrically connected to the second strip structure and the plurality of second circular arc structures, after the first electrode is rotated by 90 degrees around a center of the first circumference, a projection of the first electrode on the second substrate in a direction perpendicular to the second substrate coincides with the second electrode.

Figure 1:
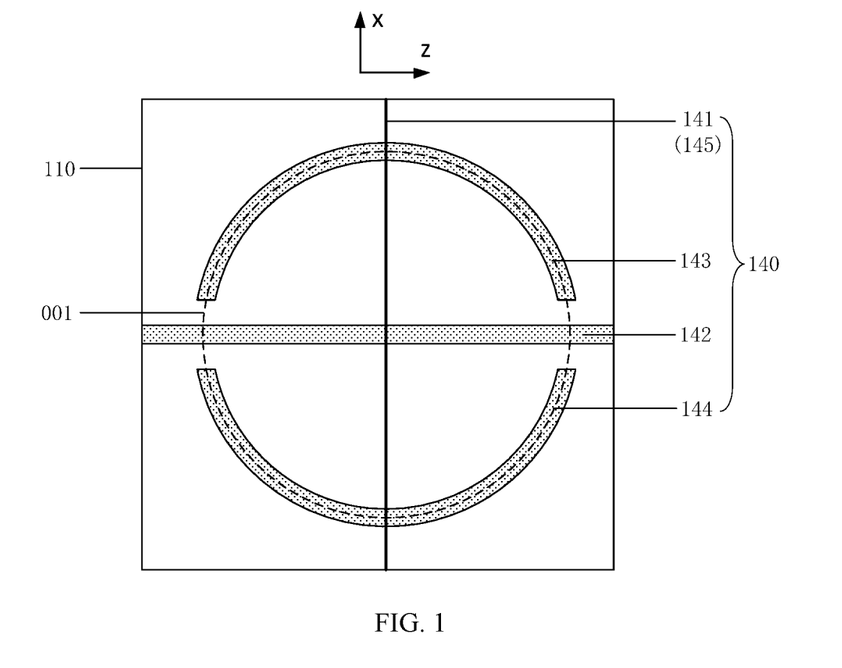
FIG. 1 is a top plan view of a first substrate of a metamaterial structure unit provided by an embodiment of the present disclosure.
Figure 2:
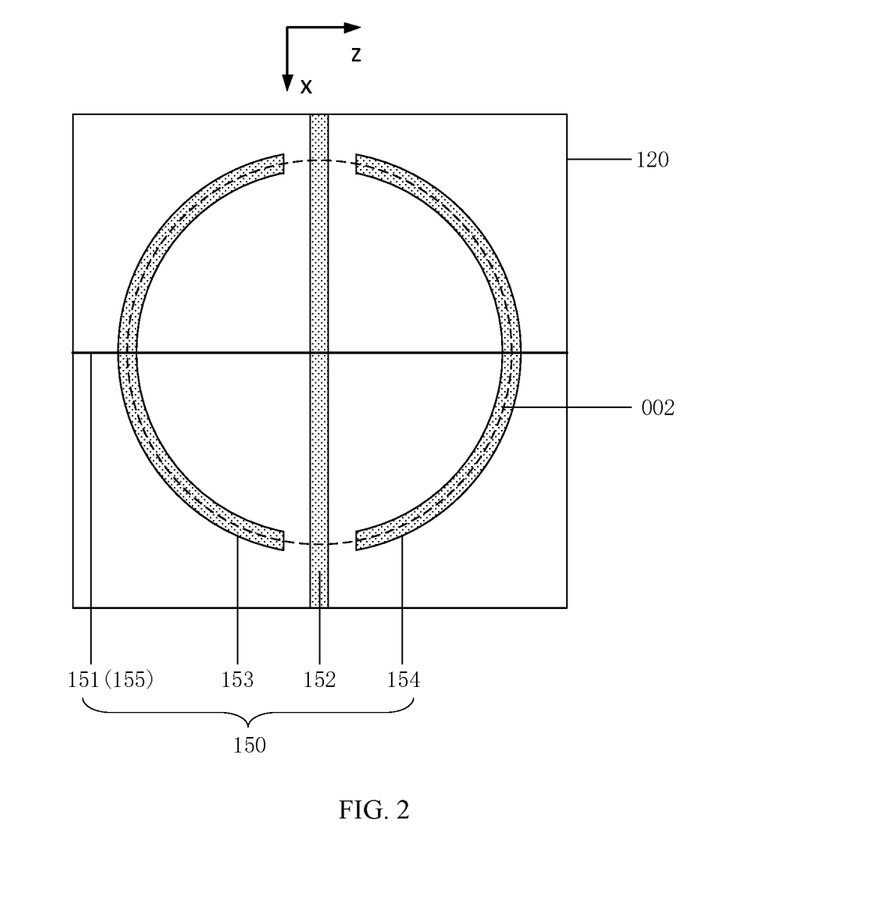
FIG. 2 is a bottom view of a second substrate of a metamaterial structure unit shown in FIG. 1.
Figure 3:
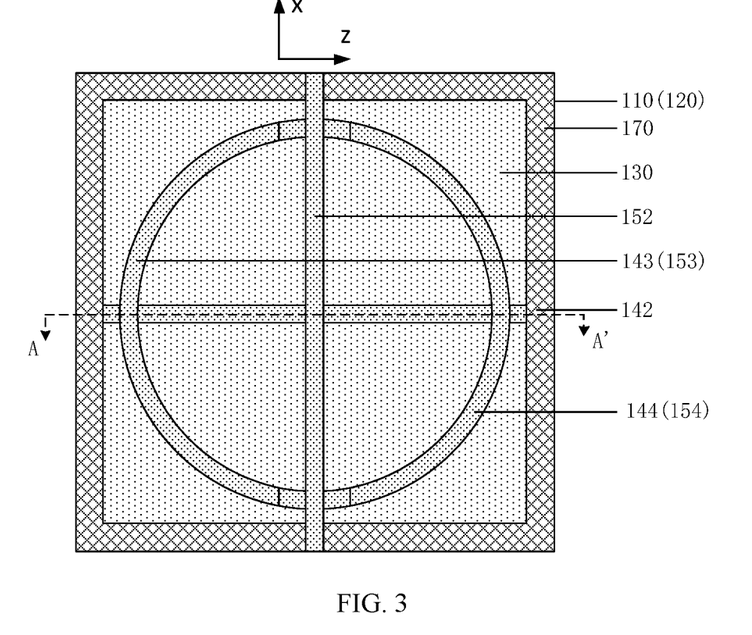
FIG. 3 is a top perspective view of the metamaterial structure unit shown in FIG. 1.
Figure 4:
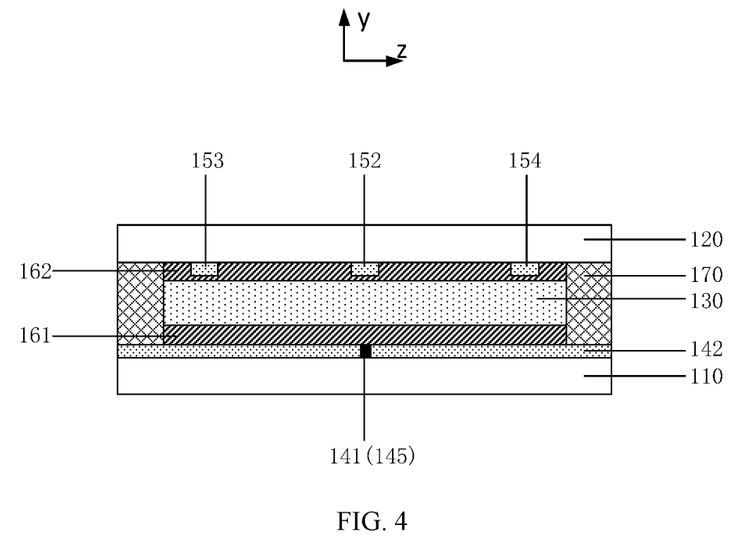
FIG. 4 is a schematic cross-sectional view of the metamaterial structure unit shown in FIG. 3 taken along the direction A-A'.

FIG. 1 is a top plan view of a first substrate of a metamaterial structure unit provided by an embodiment of the present disclosure, FIG. 2 is a bottom view of a second substrate of a metamaterial structure unit shown in FIG. 1, FIG. 3 is a top perspective view of the metamaterial structure unit shown in FIG. 1, and FIG. 4 is a schematic cross-sectional view of the metamaterial structure unit shown in FIG. 3 taken along the direction A-A'. Referring to FIGS. 1 to 4, the metamaterial structure unit includes a first substrate 110, a second substrate 120, a liquid crystal layer 130, a first electrode 140, and a second electrode 150.

The first substrate 110 and the second substrate 120 are oppositely disposed and play a role of supporting, protection, insulation, etc. For example, the first substrate 110 and the second substrate 120 can be printed circuit boards (PCBs), so the metamaterial structure unit can be processed by a PCB technique, which reduces production costs. The printed circuit boards, for example, can adopt a plastic substrate, a ceramic substrate, etc. For example, the first substrate 110 and the second substrate 120 can adopt Rogers high-frequency boards, which are made of polytetrafluoroethylene. Of course, the embodiments of the present disclosure are not limited thereto, and the first substrate 110 and the second substrate 120 can adopt any suitable materials.

The liquid crystal layer 130 is disposed between the first substrate 110 and the second substrate 120. For example, the liquid crystal layer 130 can adopt a single liquid crystal material having a great anisotropy, such as nematic liquid crystal, etc., or can adopt a mixed liquid crystal material (mixed crystal), as long as it can serve as a tunable medium, which is not limited thereto by the embodiments of the present disclosure. The thickness of the liquid crystal layer 130 (i.e., the cell thickness of the liquid crystal cell formed by the first substrate 110 and the second substrate 120) can be set according to actual requirements, for example, according to required parameters such as equivalent dielectric constant, equivalent magnetic permeability, and operating frequency band, etc.

The first electrode 140 is disposed on the first substrate 110. The first electrode 140 includes a first connecting portion 141, a first strip structure 142, and a plurality of first circular arc structures 143, 144 on a first circumference 001, and is disposed on a surface of the first substrate 110 close to the second substrate 120 (on an upper surface of the first substrate 110 in FIG. 4). The first strip structure 142 is distributed along a radial direction of the first circumference 001 and is separated from the first circular arc structures 143, 144. The first connecting portion 141 is electrically connected to the first strip structure 142 and the plurality of first circular arc structures 143, 144. The first electrode 140 can be made of copper, aluminum, gold, silver or any alloy thereof, or can be any other suitable metal material. For example, the first electrode 140 can be formed by an etching process, and the specific forming steps are not detailed herein.

For example, the first circular arc structures 143, 144 refers to a strip-shape structure extending in a circumferential direction of the first circumference 001. For example, a central line of the strip-shape structure along its extending direction is a circular arc shape, and the length of the strip structure refers to the dimension in the extending direction thereof (i.e., the circumferential direction). For example, the first strip structure 142 refers to a strip-shape structure extending in a certain radial direction of the first circumference 001, and the length of the strip-shape structure refers to the dimension in the extending direction thereof.

For example, in the present embodiment, the first strip structure 142 is distributed (extending) in the z direction and passes through a center of the first circumference 001. For example, the central line of the first strip structure 142 in the z direction passes through the center of the first circumference 001. For example, the length of the first strip structure 142 (the dimension in the z direction) is less than about 0.5 times of an average wavelength of a target electromagnetic wave propagating in the first substrate 110, the second substrate 120, and the liquid crystal layer 130, which can be selected as, for example, 0.2 times, 0.4 times, etc. In the embodiments of the present disclosure, the target electromagnetic wave refers to an incident electromagnetic wave when the metamaterial structure unit is working. For example, the average wavelength of the target electromagnetic wave propagating in the first substrate 110, the second substrate 120, and the liquid crystal layer 130 is a unified value of the target electromagnetic wave under the constraints of Maxwell's equation and boundary conditions.

For example, in one example, the plurality of first circular arc structures 143, 144 include two circular arc structures 143 and 144 axisymmetrically distributed about the first strip structure 142, and the two circular arc structures are located on the first circumference 001. The plurality of first circular arc structures 143, 144 and the first strip structure 142 are separated from each other, that is, the first strip structure 142 is located in a gap between the plurality of first circular arc structures 143, 144. For example, the size of the gap can be determined depending on parameters such as the width of the first strip structure 142 (dimension in the x direction), technique conditions, operating frequency bands, etc. For example, a perimeter of the first circumference 001 is less than about 1.5 times of the average wavelength of the target electromagnetic wave propagating in the first substrate 110, the second substrate 120, and the liquid crystal layer 130, which can be selected as, for example, 0.5, 0.8, 1.0, 1.2 times, etc.

For example, the first connecting portion 141 includes a first electrical lead 145 for maintaining an electrical connection between the first strip structure 142 and the plurality of first circular arc structures 143, 144, so as to apply a bias voltage to the liquid crystal layer 130 under the action of a bias voltage source separately disposed. The first electrical lead 145 is electrically connected to the first strip structure 142 and each of the plurality of first circular arc structures 143, 144. For example, in one example, the first electrical lead 145 is perpendicular to the first strip structure 142 and passes through the center of the first circumference 001, that is, the first electrical lead 145 is distributed along the x direction. The first connecting portion 141 (the first electrical lead 145) can be located in a same layer (arranged in a same layer) as the first strip structure 142 and the plurality of first circular arc structures 143, 144, or can be disposed in a different layer, for example, be located in the printed circuit board and be electrically connected to the first strip structure 142 and the plurality of first arc structures 143, 144 through via holes. For example, the width of the first electrical lead 145 is less than 10 µm to reduce interference to electromagnetic waves.

The second electrode 150 is disposed on the second substrate 120. The second electrode 150 includes a second connecting portion 151, a second strip structure 152, and a plurality of second circular arc structures 153, 154 on a second circumference 002, and is disposed on a surface of the second substrate 120 close to the first substrate 110 (on a lower surface of the second substrate 120 in FIG. 4). The second strip structure 152 is distributed along a radial direction of the second circumference 001 and is separated from the second circular arc structures 153, 154. The second connecting portion 151 is electrically connected to the second strip structure 152 and the plurality of second circular arc structures 153, 154. The second electrode 140 can be made of copper, aluminum, gold, silver or any alloy thereof, or can be any other suitable metal material. For example, the second electrode 140 can be formed by an etching process, and the specific forming steps are not detailed herein.

For example, the second circular arc structures 153, 154 refers to a strip-shape structure extending in a circumferential direction of the second circumference 002. For example, a central line of the strip-shape structure along its extending direction is a circular arc shape, and the length of the strip structure refers to the dimension in the extending direction thereof (i.e., the circumferential direction). For example, the second strip structure 152 refers to a strip-shape structure extending in a certain radial direction of the first circumference 002, and the length of the strip-shape structure refers to the dimension in the extending direction thereof.

For example, in the present embodiment, the second strip structure 152 is distributed (extending) in the x direction and passes through a center of the second circumference 002. For example, the central line of the second strip structure 152 in the x direction passes through the center of the second circumference 002. For example, the length of the second strip structure 152 (the dimension in the x direction) is less than about 0.5 times of the average wavelength of the target electromagnetic wave propagating in the first substrate 110, the second substrate 120, and the liquid crystal layer 130, which can be selected as, for example, 0.2 times, 0.4 times, etc.

For example, in one example, the plurality of second circular arc structures 153, 154 include two circular arc structures 153 and 154 axisymmetrically distributed about the second strip structure 152, and the two circular arc structures are located on the second circumference 002. The plurality of second circular arc structures 153, 154 and the second strip structure 152 are separated from each other, that is, the second strip structure 152 is located in a gap between the plurality of second circular arc structures 153, 154. For example, the size of the gap can be determined depending on parameters such as the width of the second strip structure 152 (dimension in the z direction), technique conditions, operating frequency bands, etc. For example, a perimeter of the second circumference 002 is less than about 1.5 times of the average wavelength of the target electromagnetic wave propagating in the first substrate 110, the second substrate 120, and the liquid crystal layer 130, which can be selected as, for example, 0.5, 0.8, 1.0, 1.2 times, etc.

For example, the second connecting portion 151 includes a second electrical lead 155 for maintaining an electrical connection between the second strip structure 142 and the plurality of second circular arc structures 153, 154, so as to apply a bias voltage to the liquid crystal layer 130 under the action of a bias voltage source separately disposed. The second electrical lead 155 is electrically connected to the second strip structure 152 and each of the plurality of second circular arc structures 153, 154. For example, in one example, the second electrical lead 155 is perpendicular to the second strip structure 152 and passes through the center of the second circumference 002, that is, the second electrical lead 155 is distributed along the z direction. The second connecting portion 151 (the second electrical lead 155) can be located in a same layer (arrangement in a same layer) as the second strip structure 152 and the plurality of second circular arc structures 153, 154, or can be disposed in a different layer, for example, be located in the printed circuit board and be electrically connected to the second strip structure 152 and the plurality of second circular arc structures 153, 154 through via holes. For example, the width of the second electrical lead 155 is less than 10 µm to reduce interference to electromagnetic waves.

For example, in the present embodiment, after the first electrode 140 is rotated by 90 degrees around the center of the first circumference 001, a projection of the first electrode 140 on the second substrate 120 in a direction perpendicular to the second substrate (e.g., y direction) coincides with the second electrode 150. Similarly, after the second electrode 150 is rotated by 90 degrees around the center of the second circumference 002, a projection of the second electrode 150 on the first substrate 110 in a direction perpendicular to the first substrate (e.g., y direction) coincides with the first electrode 140. The first electrode 140 or the second electrode 150 can be rotated in a clockwise direction or in a counter-clockwise direction, and overlap with the other electrode after being rotated by 90 degrees. For example, the center of the first circumference 001 coincides with the center of the second circumference 002, and the perimeter of the first circumference 001 is equal to the perimeter of the second circumference 002. For example, after the first electrode 140 is rotated by 90 degrees around the center of the first circumference 001, an orthographic projection of the first electrode 140 on a plane parallel to the first substrate 110 and the second substrate 120 coincides with an orthographic projection of the second electrode 150 on the plane. In the embodiments of the present disclosure, "coincide" may refer to completely overlapping, and may also refer to that the electrode profiles substantially coincide. For example, after the first electrode 140 is rotated by 90 degrees around the center of the first circumference 001, the projection of the first electrode 140 on the second substrate 120 may have a certain degree of deviation from the profile of the second electrode 150, and the deviation may be caused, for example, by factors such as technique accuracy, design requirements, etc.

In the embodiment of the present disclosure, the three directions, x, y, and z shown in FIGS. 1 to 4 are three directions perpendicular to one other in a Cartesian coordinate system, and the three directions may be any directions perpendicular to one another in a ground reference system, wherein, for example, the y direction is a direction perpendicular to the ground, but the embodiments of the present disclosure are not limited thereto, and the coordinate system can be transformed as needed.

For example, in the embodiments of the present disclosure, both a length of each of the plurality of first circular arc structures 143, 144 and a length of each of the plurality of second circular arc structures 153, 154 are greater than ¼ of the perimeter of the first circumference 001 or the second circumference 002. In some examples, the length can be greater than ⅓ of the perimeter, ⅖ of the perimeter, and the like. By this arrangement, an electric field for driving the liquid crystal layer can be better formed between the first circular arc structures and the second circular arc structures.

In the metamaterial structure unit of the present embodiment, the first circular arc structures 143, 144 and the second circular arc structures 153, 154 constitute a two-dimensional magnetic resonance structure, which produces a two-dimensional negative magnetic permeability effect. The first strip structure 142 and the second strip structure 152 constitute a two-dimensional electric resonance structure, which produces a two-dimensional negative dielectric constant effect. Therefore, when the first circular arc structures 143, 144, the second circular arc structures 153, 154, the first strip structure 142 and the second strip structure 152 are combined, the electrode structure composed of them will exhibit a two-dimensional dual negative characteristic (the dielectric constant and the magnetic permeability are negative values, simultaneously), that is, exhibiting the dual negative characteristic for a plane electromagnetic wave incident in the x direction and a plane electromagnetic wave incident in the z direction, so that there is no serious energy attenuation when the electromagnetic wave propagates therein. By applying a bias voltage to the liquid crystal layer 130 to change its dielectric constant, the operating frequency band of the dual negative characteristic of the metamaterial structure unit can be tuned. The metamaterial structure unit has a simple structure and is easy to be processed with high precision.

For example, in one example, the metamaterial structure unit further includes a first alignment layer 161 and a second alignment layer 162. The first alignment layer 161 and the second alignment layer 162 are respectively disposed on the surfaces of the first substrate 110 and the second substrate 120 facing each other. The liquid crystal layer 130 is located between the first alignment layer 161 and the second alignment layer 162. The first alignment layer 161 and the second alignment layer 162 are used to control a preset deflection direction of the liquid crystal molecules (for example, a deflection direction in the x-z plane), and can be formed, for example, by using an organic material such as polyimide (PI), etc., and can be treated and processed by means of rubbing, irradiation, etc., to obtain alignment characteristics. Of course, the embodiments of the present disclosure are not limited thereto, and other components or devices can be employed to control the preset deflection direction of the liquid crystal molecules. For example, in other examples, the preset deflection direction of the liquid crystal molecules is controlled by a separately disposed alignment electrode and a bias voltage source, so that the first alignment layer 161 and the second alignment layer 162 can be omitted.

For example, in one example, the metamaterial structure unit further includes a package structure 170. The package structure 170 is disposed between the first substrate 110 and the second substrate 120 and surrounds the liquid crystal layer 130. The package structure 170 can adopt, for example, a sealant, for avoiding liquid crystal leakage, and playing a part in supporting the structure of the liquid crystal cell and in strengthening the thickness of the cell, etc. A main component of the sealant is a resin, and an additive, such as a heat-curable monomer or the like, can be further included as needed. Of course, the embodiments of the present disclosure are not limited thereto, and other suitable manners can be employed to avoid liquid crystal leakage and support the structure of the liquid crystal cell. For example, in other examples, the first substrate 110 is a box-like structure, and the first electrode 140, the first alignment layer 161, the liquid crystal layer 130, the second alignment layer 162, and the second electrode 150 are disposed in the bottom region of the box-like structure. The second substrate 120 is in contact with and connected to the sides of the box-like structure at the periphery, so as to encapsulate the liquid crystal layer 130 in the cavity formed by the first substrate 110 and the second substrate 120, so that the package structure 170 can be omitted.

For example, the metamaterial structure unit is a space fed type metamaterial structure unit, that is, the target electromagnetic wave enters the metamaterial structure unit by means of spatial radiation. For example, the sizes of the metamaterial structure unit in three directions (x, y, z) in the Cartesian coordinate system are less than about 0.5 times of the wavelength of the target electromagnetic wave propagating in free space, which can be selected as, for example, 0.1, 0.2, 0.3, 0.4 times, etc. Because the size of the metamaterial structure unit is much smaller than the wavelength, the metamaterial structure unit can be approximated as a uniform material, and characteristics thereof can be expressed by parameters such as equivalent dielectric constant and equivalent magnetic permeability.

Figure 5A:
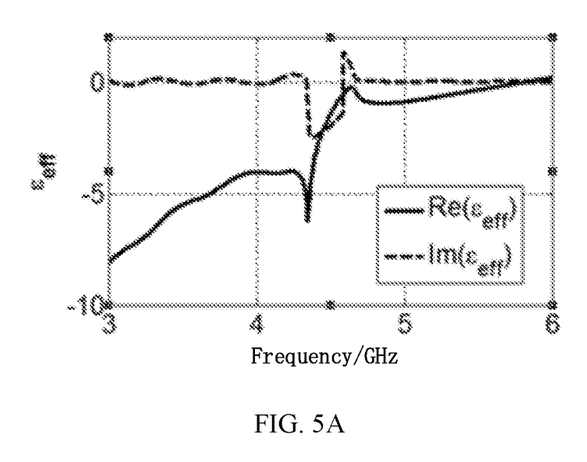
FIG. 5A is an equivalent dielectric constant curve of a metamaterial including the metamaterial structure unit as shown in FIGS. 1 to 4 in a case where the liquid crystal molecules are horizontally oriented.
Figure 5B:
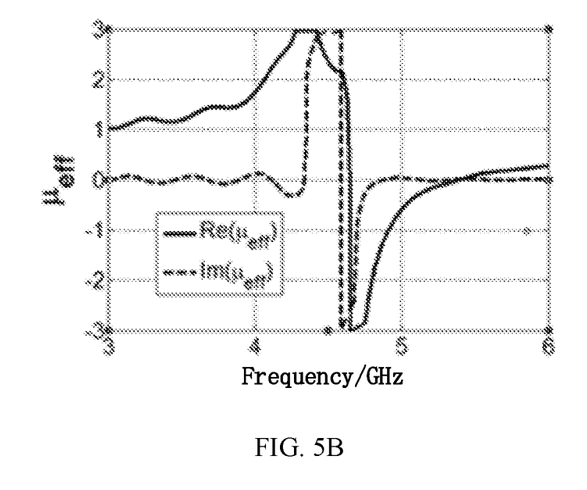
FIG. 5B is an equivalent magnetic permeability curve of a metamaterial including the metamaterial structure unit as shown in FIGS. 1 to 4 in a case where the liquid crystal molecules are horizontally oriented.
Figure 6A:
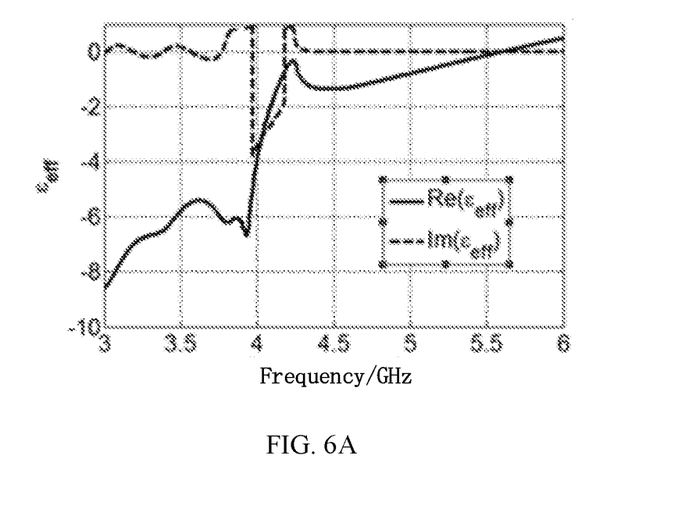
FIG. 6A is an equivalent dielectric constant curve of a metamaterial including the metamaterial structure unit as shown in FIGS. 1 to 4 in a case where the liquid crystal molecules are vertically oriented.
Figure 6B:
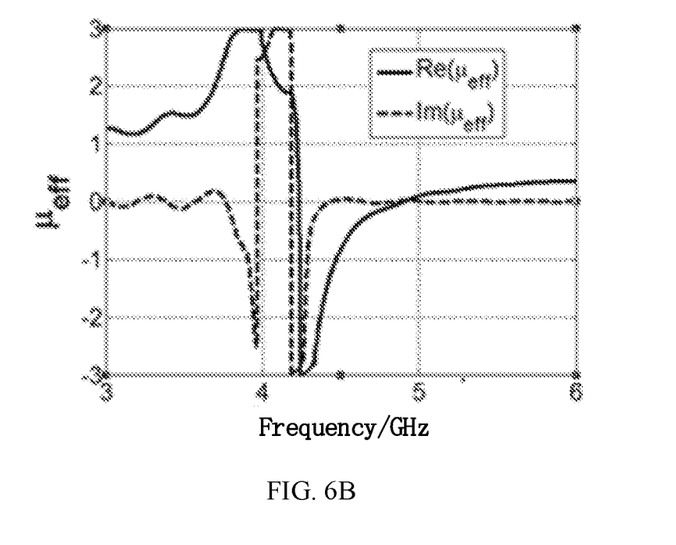
FIG. 6B is an equivalent magnetic permeability curve of a metamaterial including the metamaterial structure unit as shown in FIGS. 1 to 4 in a case where the liquid crystal molecules are vertically oriented.

FIG. 5A is an equivalent dielectric constant curve of a metamaterial including the metamaterial structure unit as shown in FIGS. 1 to 4 in a case where the liquid crystal molecules are horizontally oriented (perpendicular to the y direction), FIG. 5B is an equivalent magnetic permeability curve of a metamaterial including the metamaterial structure unit as shown in FIGS. 1 to 4 in a case where the liquid crystal molecules are horizontally oriented, FIG. 6A is an equivalent dielectric constant curve of a metamaterial including the metamaterial structure unit as shown in FIGS. 1 to 4 in a case where the liquid crystal molecules are vertically oriented (parallel to the y direction), FIG. 6B is an equivalent magnetic permeability curve of a metamaterial including the metamaterial structure unit as shown in FIGS. 1 to 4 in a case where the liquid crystal molecules are vertically oriented. In the figures, solid lines represent a real part Re of the corresponding parameter, dashed lines represent an imaginary part Im of the corresponding parameter, $\varepsilon_{eff}$ represents the equivalent dielectric constant, and $\mu_{eff}$ represents the equivalent magnetic permeability.

The parameters of the various structures used in a simulation are as follows. The metamaterial structure unit is a specific example of the metamaterial structure unit described in FIGS. 1 to 4. The first circular arc structure 143, 144 and the second circular arc structure 153, 154 have an inner radius of 2.5 mm and an outer radius of 3 mm. The first strip structure 142 and the second strip structure 152 have a length of 8 mm and a width of 0.5 mm. The liquid crystal layer 130 adopts a nematic liquid crystal with a thickness of 0.2 mm, and when the liquid crystal molecules are horizontally oriented, the dielectric constants of the liquid crystal molecules in the three directions of x, y, and z are [3.3, 2.5, 2.5], respectively, and when the liquid crystal molecules are vertically oriented, the dielectric constants in the three directions of x, y and z are [2.5, 3.3, 2.5], respectively. Both the first substrate 110 and the second substrate 120 have a dielectric constant of 3.8 and a thickness of 0.5 mm.

Referring to FIGS. 5A and 5B, when the liquid crystal molecules are horizontally oriented, the equivalent dielectric constant and the equivalent magnetic permeability are both negative values in the 4.8 GHz-5.3 GHz band (the real part is a negative value, and the imaginary part is 0), that is, at this time, the metamaterial has a dual negative characteristic in the 4.8 GHz-5.3 GHz band. Referring to FIGS. 6A and 6B, when the liquid crystal molecules become vertically oriented, the equivalent dielectric constant and the equivalent magnetic permeability are both negative in the 4.3 GHz-5.9 GHz band, that is, the metamaterial has a dual negative characteristic in the 4.3 GHz-5.9 GHz band. The change in the orientation of the liquid crystal molecules causes a change in the operating frequency band of the dual negative characteristic of the metamaterial. For example, the deflection angle of the liquid crystal molecules can be controlled by controlling the magnitude of the bias voltage applied to the first electrode 140 and the second electrode 150, thereby controlling the operating frequency band of the dual negative characteristic of the metamaterial, the bias voltage and the deflection angle. The specific correspondence between the bias voltage and the deflection angle can be obtained by theoretical calculation or practical test.

It should be noted that, in the simulation model, only the dielectric constant of the liquid crystal material located in a region right opposite to the first electrode 140 and the second electrode 150 is set to change under the action of the bias voltage, while the dielectric constant of the liquid crystal material located in other regions will remain unchanged. This numerical simulation method is actually a conservative calculation of the performance of the metamaterial, that is to say, the practical test results of the metamaterial will be better than the numerical simulation results.

At least one embodiment of the present disclosure provides a metamaterial, which includes the metamaterial structure unit according to any one embodiment of the present disclosure. The metamaterial has dual negative characteristics in two dimensions (for example, x direction and z direction), of which the operating frequency band of the dual negative characteristics can be tuned, and has a simple structure and is easy to be processed with high precision.

Figure 7:
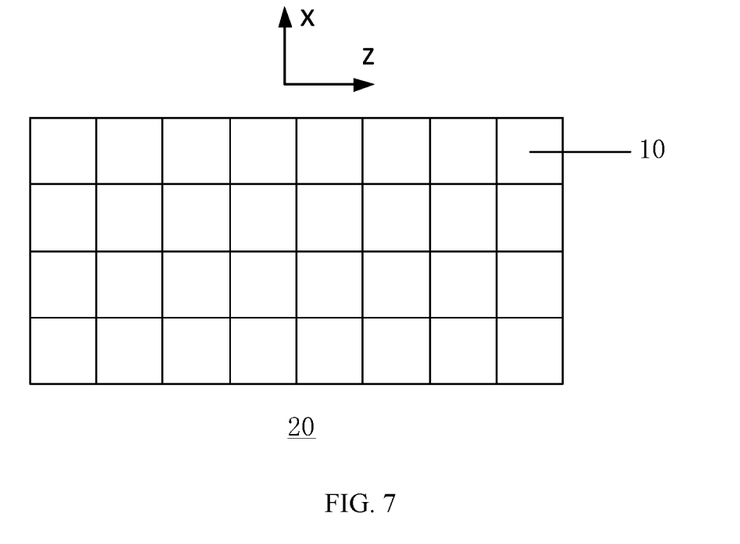
FIG. 7 is a schematic block diagram of a metamaterial provided by an embodiment of the present disclosure.

FIG. 7 is a schematic block diagram of a metamaterial provided by an embodiment of the present disclosure. Referring to FIG. 7, the metamaterial 20 includes metamaterial structure units 10, which are metamaterial structure units according to any of the embodiments of the present disclosure. For example, the metamaterial structure units 10 can be the metamaterial structure unit described in FIGS. 1 to 4. For example, the metamaterial 20 is formed by a periodical distribution of the metamaterial structure units 10 in space, for example, the periodic distribution may be in the form of a standard matrix (i.e., m rows×n columns). Of course, the embodiments of the present disclosure are not limited thereto. In another example, the periodic distribution manner of the metamaterial structure units 10 can also be in the form of a non-standard matrix, for example, a former row and a latter row are staggered from each other by a predetermined distance (for example, a half of the width of the metamaterial structure unit 10), or the periodic distribution manner of the metamaterial structure units 10 can also be other suitable planar or spatial distributions. By applying a bias voltage to the metamaterial 20, the operating frequency band of the dual negative characteristic of the metamaterial 20 can be varied to meet a variety of application requirements. It should be noted that, in various embodiments of the present disclosure, the metamaterial 20 can further include other components or structures to complete the function of the metamaterial 20. For example, in a case where the metamaterial includes a plurality of metamaterial structure units, the plurality of metamaterial structure units can share the first substrate and the second substrate. That is to say, the first electrodes of the plurality of metamaterial structure units are formed on the same first substrate and arranged in an array on the first substrate, and the second electrodes of the plurality of metamaterial structure units are formed on the same second substrate and arranged in an array on the second substrate.

At least one embodiment of the present disclosure further provides an electronic device, which includes the metamaterial structure unit according to any one embodiment of the present disclosure or the metamaterial according to any one embodiment of the present disclosure. The metamaterial or the metamaterial structure unit in the electronic device has dual negative characteristics in two dimensions (for example, x direction and z direction), of which the operating frequency band of the dual negative characteristics can be tuned, and has a simple structure and is easy to be processed with high precision.

Figure 8:
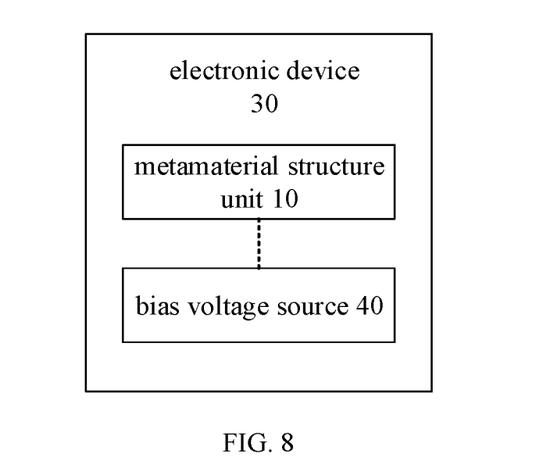
FIG. 8 is a schematic block diagram of an electronic device provided by an embodiment of the present disclosure.

FIG. 8 is a schematic block diagram of an electronic device provided by an embodiment of the present disclosure. Referring to FIG. 8, the electronic device 30 includes a metamaterial structure unit 10, which is the metamaterial structure unit according to any one embodiment of the present disclosure. For example, the electronic device 30 can be any device applied in the fields of super-resolution imaging, ultra-fast optical switch, transformation optics, invisibility cloak, power splitter, etc., and the embodiments of the present disclosure are not limited thereto. The electronic device 30 can further include more components, and the connection relationship between each component and the metamaterial structure unit 10 is not limited.

For example, in one example, the electronic device 30 further includes a bias voltage source 40. The bias voltage source 40 is used to provide a bias electric field to the liquid crystal layer 130 in the metamaterial structure unit 10. The bias voltage source 40 can be a direct current power source; or the bias voltage source 40 is a voltage output terminal of a control chip (not shown in FIG. 8), and can change the magnitude of the output voltage or the like according to a control signal. For example, the first electrode 140 and the second electrode 150 are configured to be connected to the bias voltage source 40, so as to provide a bias electric field to the liquid crystal layer 130. For example, the direction of the bias electric field is substantially parallel to the y direction. For example, the first electrode 140 and the second electrode 150 can be electrically connected to the bias voltage source 40 through separately provided electrical leads. By controlling the output voltage of the bias voltage source 40, the liquid crystal molecules in the liquid crystal layer 130 can be deflected, and the operating frequency band of the dual negative characteristic of the metamaterial structure unit 10 can be changed under the combined action of the first alignment layer 161 and the second alignment layer 162. The setting position of the bias voltage source 40 is not limited and can be determined according to the specific structure and size of the electronic device 30.

A potential relationship between the first electrode 140 and the second electrode 150 is not limited. For example, the first electrode 140 can be connected to a positive voltage terminal, while the second electrode 150 can be grounded, so that the potential of the first electrode 140 is higher than the potential of the second electrode 150. Alternatively, the second electrode 150 can be connected to a positive voltage terminal, while the first electrode 140 can be grounded, so that the potential of the second electrode 150 is higher than the potential of the first electrode 140. Of course, the embodiments of the present disclosure are not limited thereto. The first electrode 140 and the second electrode 150 can adopt other suitable connection manners, for example, one electrode is connected to a negative voltage terminal while the other electrode is connected to a positive voltage terminal.

At least one embodiment of the present disclosure further provides a preparation method of the metamaterial structure unit and the metamaterial adopting the metamaterial structure unit according to any one embodiment of the present disclosure. The preparation method includes: providing a first substrate and a second substrate; disposing the first substrate and the second substrate oppositely, and providing a liquid crystal layer between the first substrate and the second substrate. The metamaterial structure unit or the metamaterial prepared by the preparation method has dual negative characteristics in two dimensions (for example, x direction and z direction), of which the operating frequency band of the dual negative characteristics can be tuned, and has a simple structure and is easy to be processed with high precision.

For example, in one example, the preparation method includes the following steps: Step S501: providing a first substrate 110 and a second substrate 120; Step S502: disposing the first substrate 110 and the second substrate 120 oppositely, and providing a liquid crystal layer 130 between the first substrate 110 and the second substrates 120.

For example, the first substrate 110 is provided with a first electrode 140, and the second substrate 120 is provided with a second electrode 150. For example, the first electrode 140 can be formed on the first substrate 110 by means of etching, and the second electrode 150 can be formed on the second substrate 120 by means of etching.

It should be noted that, in various embodiments of the present disclosure, the preparation method of the metamaterial structure unit 10 or the metamaterial 20 adopting the metamaterial structure unit 10 is not limited to the steps and the sequence described above, and can include more or fewer steps, the sequence between the steps can be determined according to actual needs.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The foregoing are merely exemplary embodiments of the invention, but is not used to limit the protection scope of the invention. The protection scope of the invention shall be defined by the attached claims.

What is claimed is:

1. A metamaterial structure unit, comprising a first substrate and a second substrate opposite to each other, a liquid crystal layer between the first substrate and the second substrate, a first electrode on the first substrate and a second electrode on the second substrate, wherein
the first electrode comprises a first connecting portion, a first strip structure and a plurality of first circular arc structures on a first circumference, the first strip structure is distributed along a radial direction of the first circumference and is separated from the first circular arc structures, the first connecting portion is electrically connected to the first strip structure and the plurality of first circular arc structures,
the second electrode comprises a second connecting portion, a second strip structure and a plurality of second circular arc structures on a second circumference, the second strip structure is distributed along a radial direction of the second circumference and is separated from the second circular arc structures, the second connecting portion is electrically connected to the second strip structure and the plurality of second circular arc structures,
in a case that the first electrode is rotated by 90 degrees around a center of the first circumference, a projection of the first electrode on the second substrate in a direction perpendicular to the second substrate coincides with the second electrode.

2. The metamaterial structure unit according to claim 1, wherein the plurality of first circular arc structures comprise two circular arc structures axisymmetrically distributed about the first strip structure,
the plurality of second circular arc structures comprise two circular arc structures axisymmetrically distributed about the second strip structure.

3. The metamaterial structure unit according to claim 1, wherein both a perimeter of the first circumference and a perimeter of the second circumference are less than 1.5 times of an average wavelength of a target electromagnetic wave propagating in the first substrate, the second substrate, and the liquid crystal layer.

4. The metamaterial structure unit according to claim 1, wherein both a length of the first strip structure and a length of the second strip structure are less than 0.5 times of an average wavelength of a target electromagnetic wave propagating in the first substrate, the second substrate, and the liquid crystal layer.

5. The metamaterial structure unit according to claim 1, wherein both a length of each of the plurality of first circular arc structures and a length of each of the plurality of second circular arc structures are greater than ¼ of a perimeter of the first circumference or the second circumference.

6. The metamaterial structure unit according, claim 1, wherein
the first connecting portion comprises a first electrical lead, the first electrical lead is electrically connected to the first strip structure and the plurality of first circular arc structures,
the second connecting portion comprises a second electrical lead, the second electrical lead is electrically connected to the second strip structure and the plurality of second circular arc structures.

7. The metamaterial structure unit according to claim 6, wherein the first electrical lead is perpendicular to the first strip structure and passes through the center of the first circumference, the second electrical lead is perpendicular to the second strip structure and passes through a center of the second circumference.

8. The metamaterial structure unit according to claim 6, wherein both a width of the first electrical lead and a width of the second electrical lead are less than 10 μm.

9. The metamaterial structure unit according to claim 1, wherein
the first connecting portion, the first strip structure and the plurality of first circular arc structures are in a same layer, the second connecting portion, the second strip structure and the plurality of second circular arc structures are located in a same layer.

10. The metamaterial structure unit according to claim 1, wherein sizes of the metamaterial structure unit in three directions in a Cartesian coordinate system are less than 0.5 times of a wavelength of a target electromagnetic wave propagating in a free space.

11. The metamaterial structure unit according to claim 1, wherein the first electrode and the second electrode are respectively located on surfaces of the first substrate and the second substrate facing each other.

12. The metamaterial structure unit according to claim 1, further comprising a first alignment layer and a second alignment layer,
wherein the first alignment layer and the second alignment layer are respectively located on surfaces of the first substrate and the second substrate facing each other.

13. The metamaterial structure unit according to claim 1, wherein the liquid crystal layer comprises nematic liquid crystal.

14. The metamaterial structure unit according to claim 1, further comprising a package structure, wherein the package structure is located between the first substrate and the second substrate and surrounds the liquid crystal layer.

15. A metamaterial, comprising the metamaterial structure unit according to claim 1, wherein the metamaterial comprises a plurality of metamaterial structure units, the plurality of metamaterial structure units share the first substrate and the second substrate.

16. The metamaterial according to claim 15, wherein the plurality of metamaterial structure units are arranged along directions parallel to the first substrate or the second substrate to form an array.

17. An electronic device, comprising the metamaterial structure unit according to claim 1.

18. The electronic device according to claim 17, further comprising a bias voltage source, wherein the first electrode and the second electrode are connected to the bias voltage source to provide a bias electric field to the liquid crystal layer.

* * * * *